C. B. COTTON.
METHOD AND APPARATUS FOR GINNING COTTON.
APPLICATION FILED MAR. 25, 1918.

1,341,168.

Patented May 25, 1920.

Inventor
Claborn B. Cotton
By Bedford & Doolittle,
Attorneys

UNITED STATES PATENT OFFICE.

CLABORN B. COTTON, OF DARDANELLE, ARKANSAS.

METHOD AND APPARATUS FOR GINNING COTTON.

1,341,168.  Specification of Letters Patent.  Patented May 25, 1920.

Application filed March 25, 1918. Serial No. 224,576.

*To all whom it may concern:*

Be it known that I, CLABORN B. COTTON, a citizen of the United States, residing at Dardanelle, Yell county, and State of Arkansas, have invented and discovered certain new and useful Improvements in Methods and Apparatus for Ginning Cotton, of which the following is a specification.

My said invention relates to method of and apparatus for removing the partly ginned cotton from the roll box of a gin, and transferring the same to a linter for final treatment.

The purpose of the invention is to pass the partly ginned cotton through the gins in greater quantities and less time than is obtainable with the apparatus now used, and more especially with the apparatus disclosed in my U. S. Patent No. 1,234,092 and dated July 17, 1917, and on which invention the present disclosure is proposed as an improvement.

A suitable apparatus for carrying out the operations above stated is illustrated in the accompanying drawings, wherein:—

Figure 1:
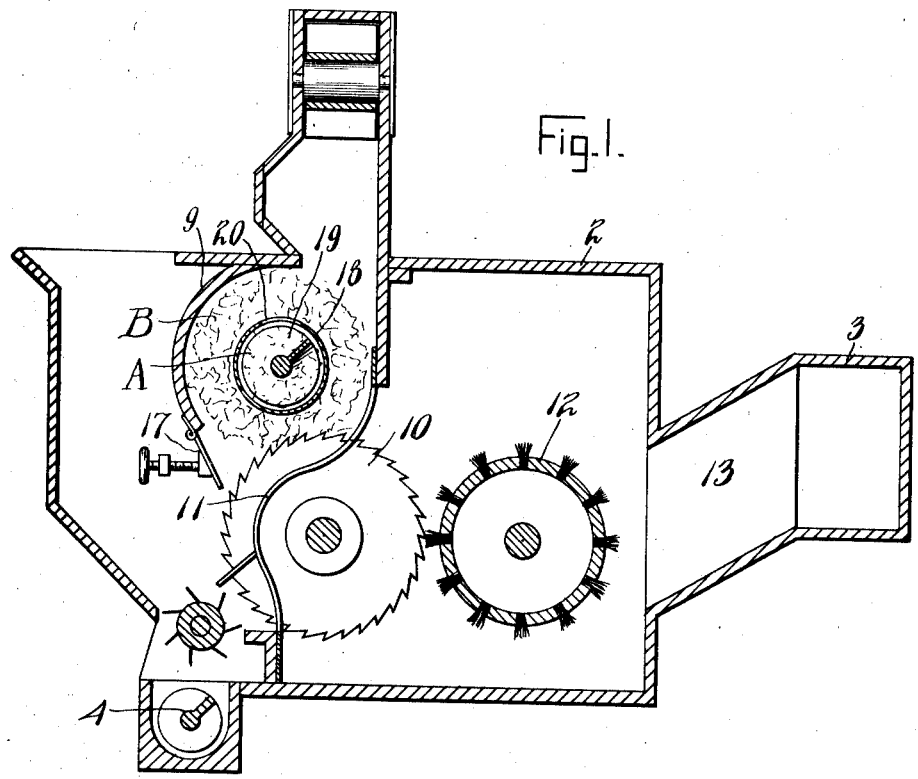
Figure 2:
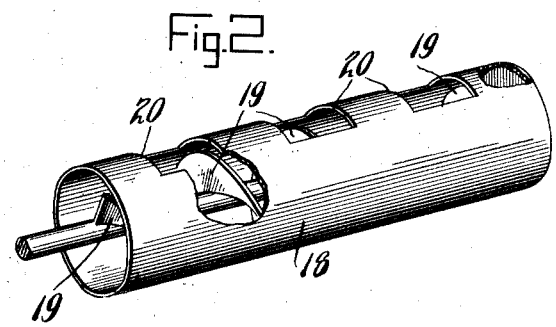

Figure 1 is a transverse sectional view of the gin showing the application of the invention, and Fig. 2 is the apparatus *per se* of the invention.

Referring to the apparatus in more detail, 1 designates a suitable conveyer for delivering the seed cotton to the gin 2 for the primary ginning, and the fiber from the several gins is discharged into the flue 3 after the ordinary manner. It will be understood that the device is used in each gin of a battery of gins arranged and working after the manner shown in my patent above referred to. The partially ginned seeds from the first ginning operation are delivered at the seed outlets of the gins (only one being shown) into a screw conveyer 4 that discharges into a suitable conveyer (not shown) for delivery to the usual condenser.

The gin 2 is of the ordinary and well known construction, having the usual roll holder, or breast 9, the gang of saws 10, grate 11, and brush 12, for delivering the fiber from the saws and blowing it out through the chute 13 into the flue 3. The roll box has a plate 17 adjustably mounted thereon for regulating the pressure or compactness of the cotton roll within the box 9 after the usual manner.

The apparatus described in the foregoing is the same as that disclosed in my U. S. patent above referred to and therefore forms no part of the present invention. The said apparatus shows only a particular adaptation of the instant invention, but it will be understood that the attachment or feature in question may be used to great advantage in the operation of ordinary gins.

The apparatus or attachment *per se* consists of a pipe or tube 18 located centrally within the roll box 9 and secured therein at the ends of the roll box by any suitable fastening means. A screw 19 is journaled to rotate in said tube 18 and conveys, through the tube, the partly ginned cotton A that separates from the loose cotton roll B contained in said roll box and which roll is kept revolving by the motion of the saws. The revolving saws will draw gin-cut fiber and seed fur from the lower rear side of the roll, between the bars of the grate 11. The delinted seed will fall out through the roll and escape through the opening of the roll box and on to the screw conveyer 4 whence it is discharged into a suitable receiver.

The tube 19 is provided with a plurality of openings 20, preferably rectangular, on the upper surface thereof, and said openings receive the partly ginned cotton, as the latter separates from the moving roll or cotton matte A. This cotton (*i. e.* within the conveyer tube 18) is carried out to the end of said tube 18 and then transferred into the linter where it is stripped of every particle of merchantable lint.

It may be here stated that the cotton is maintained in the roll box in the form of a very loose roll in order to readily take therefrom the partly ginned cotton. By this arrangement, and with using the screw conveyer through the center of the loose roll, it will be possible to put approximately one-third ($\frac{1}{3}$) more cotton through the gin, within a given period than is now possible. The partly ginned cotton is then passed on to a common linter and there run with another loose roll for stripping the seed of every particle of lint and without making any short lint. In this manner of treating the cotton approximately twenty pounds to thirty-five pounds more lint is obtained than by any other present known system.

It is obvious that those skilled in the art may vary the details of construction and arrangement of parts without departing from the spirit of my invention and therefore I do not wish to be limited to such features except as may be required by the claims.

Having thus fully described my said invention what I claim as new and desire to secure by Letters Patent is:

1. The method of ginning cotton consisting in constantly rolling a mass of seed-cotton, subtracting the fibers from the seeds at the exterior of the roll, adding seed cotton to the exterior of the roll whereby the partially delinted seeds are forced to move continuously inwardly as the cotton is so added and removing the partially delinted seeds from the interior of the roll.

2. The method of ginning cotton consisting in continuously rolling a mass of seed cotton, subtracting the fibers from the seeds at the exterior of the roll whereby the partially delinted seeds are forced to move continuously inwardly as the cotton is so added and the size of the roll maintained substantially uniform and removing the partially delinted seeds from the axis of rotation of the roll.

3. An apparatus for ginning cotton consisting in a roll box, a breast, gin saws rotating through an arc of the roll box, a tubular member fixed substantially co-axially with the roll box and having openings in its upper side, and a conveyer disposed within the tubular member and adapted to withdraw material longitudinally therefrom.

4. An apparatus for ginning cotton consisting in a roll box, saws moving in an arc through an arc of the roll box, a tubular member fixed substantially co-axially of the roll box and having openings in its upper side and a worm rotating in the tubular member adapted to discharge material longitudinally from the tubular member.

5. An apparatus for ginning cotton comprising a roll box and gin saws, a cylindrical member fixed substantially coaxially within the roll box and having an open upper side and a conveyer operating within the cylindrical member adapted to discharge material longitudinally therefrom.

In witness whereof, I have hereunto set my hand and seal at Dardanelle, Arkansas, this 21st day of March, A. D. nineteen hundred and eighteen.

CLABORN B. COTTON. [L. S.]

Witnesses:
L. C. ADAMS,
ELTON BONSON.